Dec. 22, 1931.  A. F. DODSON  1,837,810
COMBINED KEY HOLDER AND RECORD DEVICE
Filed Feb. 26, 1930
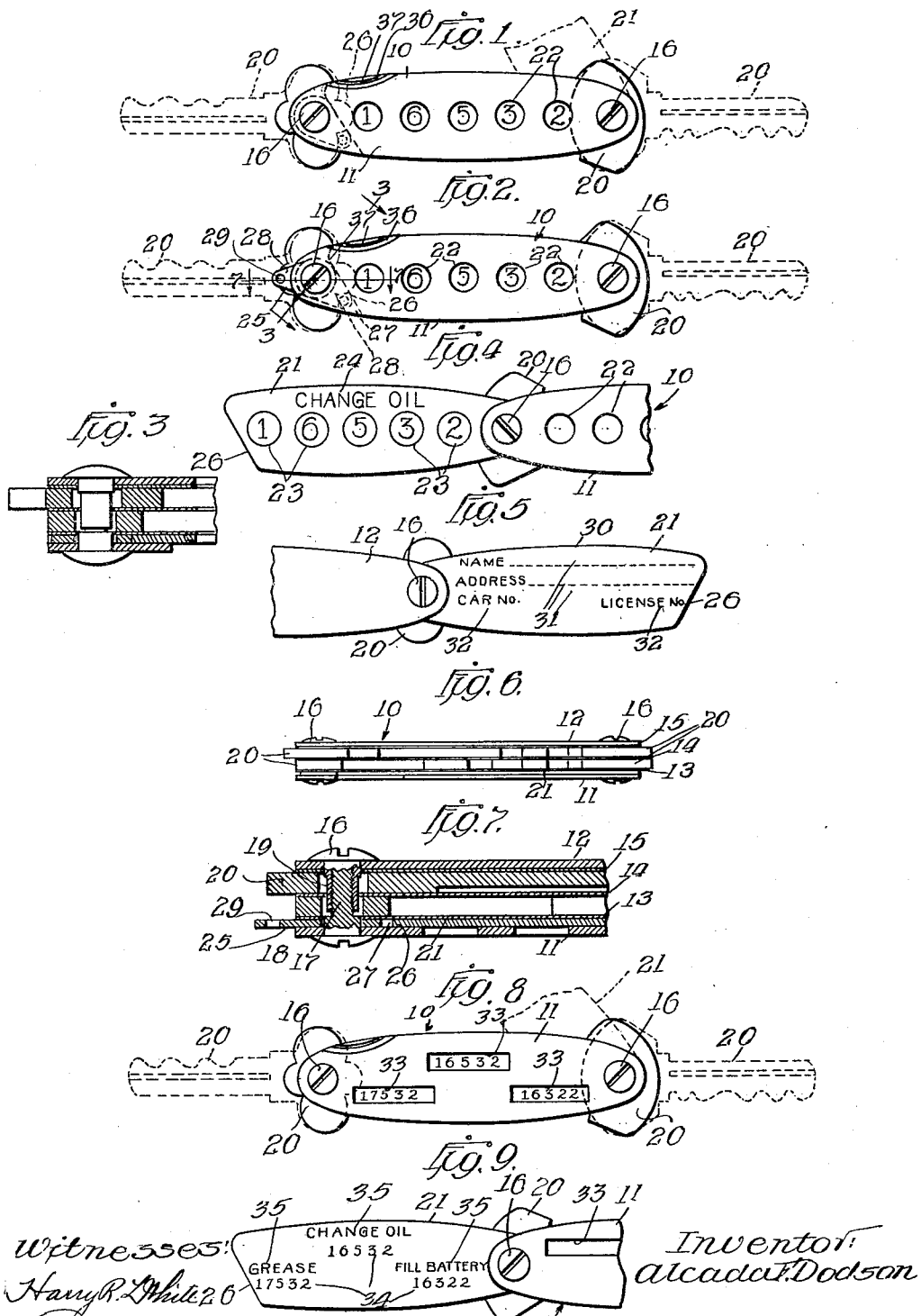

Patented Dec. 22, 1931

1,837,810

UNITED STATES PATENT OFFICE

ALCADA F. DODSON, OF CHICAGO, ILLINOIS

COMBINED KEY HOLDER AND RECORD DEVICE

Application filed February 26, 1930. Serial No. 431,592.

This invention relates to improvements in key holding or retaining devices and has special reference to a key holder combined with a convenient means for keeping record of certain facts relating to the devices to which the keys apply.

An example of such record might be a number so registered that the ownership of the key holder could be identified. Another example, and one which is herein illustrated, relates to certain facts regarding the operation of an automobile, the holder containing the automobile and associated keys such as the garage and spare tire keys.

The object of the invention is to provide such a device for the suggested or similar purposes which will associate with the keys in a convenient manner information especially required for properly operating the device to which the keys appertain, such for instance, as the mileage when the oil should be changed on the automobile; the automobile greased; the battery filled, etc.

Among other features of importance is a convenient means for attaching the device to a retaining chain in place of the usual key ring, the attachment means being hidden until its use is desired, and such means serving at all times as a spacer and a stop for the record carrying means.

Further features of importance will be made clear by the following description and claims taken in conjunction with the accompanying drawings forming part of this specification and in which:—

Fig. 1 is a side elevation of an automobile key holder made in accordance with my invention;

Fig. 2 is a view similar to Fig. 1 but showing the chain connector in extended position;

Fig. 3 is a sectional view on the line 3—3 of Fig. 2;

Fig. 4 is a fragmentary side-view showing the record member extended;

Fig. 5 is a view similar to Fig. 4 but showing the opposite side of the record member;

Fig. 6 is an edge view of the device;

Fig. 7 is a fragmentary, central, longitudinal section on the line 7—7 of Fig. 2;

Fig. 8 is a view similar to Fig. 1 but illustrating a slight modification of the invention; and Fig. 9 is a view similar to Fig. 4 but showing the modified form.

The device is a combined key holder especially adapted for holding the keys which relate to an automobile and in connection therewith present a visible record indicating the point in the operation of the automobile when it will be desirable to change the crank case oil, grease the car, or examine and fill the storage battery. In connection with this record of operation, space is provided for an owner's record, such as name, license number, car number, etc.

The device, as shown in the drawings at 10, is preferably made in the form of a pocket knife, having flat side cover members 11 and 12 preferably made of some suitable sheet material which is ornamental, such as colored celluloid, or the like.

Preferably, sheet metal members 13, 14 and 15 of the same shape and dimensions of the side members 11 and 12 are provided and all of these members are held together by fastening devices 16 arranged adjacent to the ends of the holder. As best shown in Fig. 7, the fastening member 16 consists of separable screw members 17 and 18, which present a central cylindrical bearing part 19 upon which various articles such as keys 20 can be pivotally mounted to be swung into the holder for storage or out of the holder, as indicated in dotted lines in the several figures, for use.

Between the cover member 11 and the adjacent metal member 13 is arranged a record member 21 made of suitable sheet material, such as opaque white celluloid rough on its surfaces so that it can be written upon.

This record member is pivotally mounted at one end on one of the fasteners 16 to swing out and in, as indicated in the drawings. The cover member 11 is provided, next to which the record member is arranged, with sight openings through which the record member is visible. In the preferred form, these sight openings, as shown at 22, are arranged in a longitudinal series of five openings and the record member 21 is provided with a similar series of designated spaces 23 adapted to register with the openings 22 when the record member is positioned within the device, as shown in Figs. 1 and 2.

As shown in Fig. 4, the record member 21 may be provided with a legend 24 above the series of record spaces 23 to indicate an action to be taken, such as to change the oil in the crank case. The point in the operation of the automobile at which the oil is to be changed, or has been changed, is recorded in the spaces 23, such for instance, as "16532" meaning that the oil was changed when the speedometer registered that the automobile had run that number of miles.

The holder is preferably shaped as shown, that is, wider at the middle and narrower at the ends for convenience in housing the keys and rotating to operative position.

The record member 21 is shaped similar to the holder and is free to be swung out and in. It is, however, desirable that a certain amount of friction be maintained on the keys so that when swung out for use, there will be no tendency to rattle and this is attained by the screw pivots which are capable of being adjusted as to tightness.

In order to provide space into which the record member 21 can be readily housed, a spacer member 25 is arranged on the pivot 16 adjacent to the free end 26 of the record member. The spacer member 25 is thick enough so that when the screw pivot upon which it is mounted is adjusted to properly hold the keys, the record member is free to be swung out and in.

The spacer member 25 is in the shape of a flat round washer and the end 26 of the record member 21 is adapted to contact with the edge thereof when it registers accurately with the cover member 11.

The end 26 is cut off on a slant as shown to freely pass the spacer 25 as it is swung out and in and to contact with same when swung in to its limiting position.

The inclined end of the record member provides a space 27 adjacent to the spacer member 25 in which is housed a projection 28 on the edge of the spacer member. This projection is provided with a small perforation 29, as best shown in Fig. 2, and the spacer is adapted to be swung around to cause the projection to project out from the end of the holder when desired for convenience in securing the holder upon a chain.

The inner side 30 of the record member 21 may be provided with designated recording spaces 31 with designations thereof, such as "Name", "Address", "Car No.", "License No.", etc., as shown at 32, Fig. 5.

In Figs. 8 and 9, I have illustrated a slight modification of the invention. In this form, instead of the series of sight openings shown in the preferred form, I provide a plurality of elongated sight openings 33, and I provide designated spaces 34 on the underlying record member for registry therewith when the record member is in its housed position. Adjacent to these designated spaces 34 are suitable legends 35 to indicate the action to be taken in relation to the mileage of the automobile such, for instance, as shown in Fig. 9, "Change oil", "Fill battery", "Grease", etc.

The cover member 11 is provided in one edge near the free end of the record member with a cut-away space 36 to expose the edge of the record member and this exposed edge portion is provided with a thumb nail notch 37 for convenience in swinging the record member out to its exposed position for convenience in changing the record, etc.

As many modifications of the invention will readily suggest themselves to one skilled in the art, I do not limit or confine the invention to the specific details of construction and arrangement of parts except within the scope of the appended claims.

I claim:

1. In a key holder having elongated side members joined at their ends by removable fasteners, a flat record member pivotally mounted at one end on one of said fasteners within one of said side members and adapted to be covered by same, said record member adapted to be swung out to expose its side faces, a flat spacer member arranged on the other fastener in the plane of said record member arranged and adapted to serve as a stop in housing said record member, and said spacer member having a perforated projection adapted in one position to be covered by the adjacent side member and arranged and adapted to be rotated upon the fastener to cause said perforated projection to be exposed as and for the purpose described.

2. In a device of the kind described, a flat handle member having sides, securing members passing through the sides at their ends and securing them together and adapted to be passed through automobile key handles for pivotally mounting the keys in the device, a flat record carrying member pivotally mounted to swing out and in on one of the securing members, and a co-operating stop on the other securing member slightly thicker than the record member for limiting the inward movement of the record member.

3. In a device of the kind described, a flat handle member having sides, securing members passing through the sides at their ends and securing them together and adapted to be passed through automobile key handles for pivotally mounting the keys in the device, a flat record carrying member pivotally mounted to swing out and in on one of the securing members, and a co-operating stop on the other securing member slightly thicker than the record member for limiting the inward movement of the record member, the handle member adjacent to the pivoted record carrying member having openings through which the record can be seen.

4. A key holder for automobile keys comprising a plurality of flat plates, removable securing members at the ends of the plates, the securing members adapted to be projected through key handles inserted between the plates to pivotally secure the keys, a flat record member pivotally mounted at one end on one of the securing members to swing in behind one of the sides of the holder, the record member provided with designated spaces for containing desired records to be changed from time to time, and the adjacent side of the holder provided with openings with which said spaces register when the record member is swung in behind the adjacent side as and for the purpose specified.

In witness that I claim the foregoing as my invention, I affix my signature this 19th day of February, 1930.

ALCADA F. DODSON.